J. H. COFFMAN.
Vehicle-Brake.
No. 227,348.          Patented May 11, 1880.
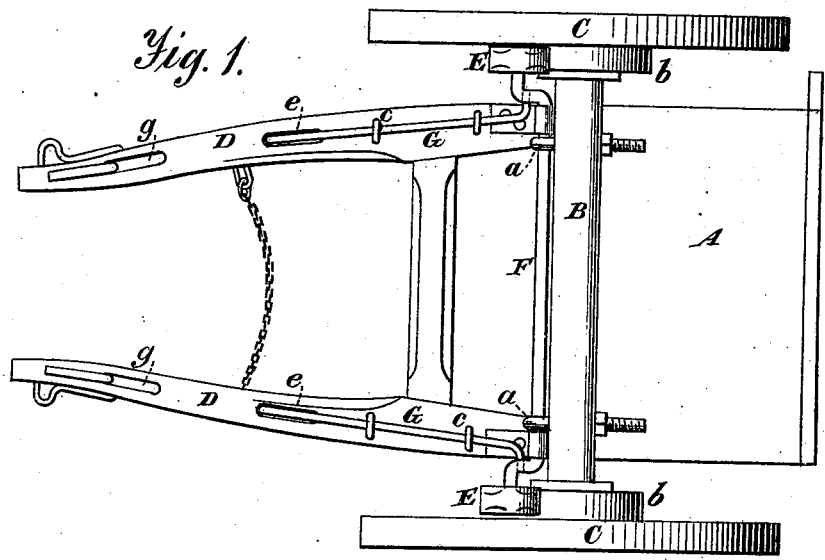
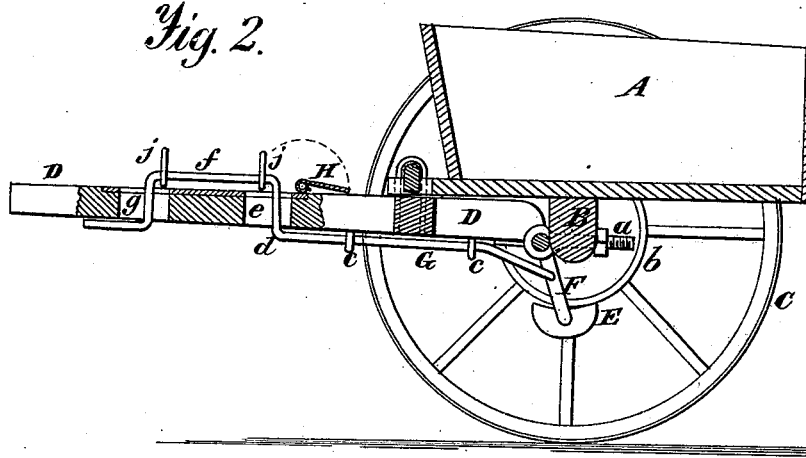
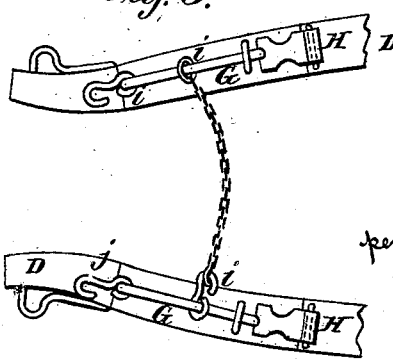

UNITED STATES PATENT OFFICE.

JACOB H. COFFMAN, OF WEST PHILADELPHIA, PENNSYLVANIA.

VEHICLE-BRAKE.

SPECIFICATION forming part of Letters Patent No. 227,348, dated May 11, 1880.

Application filed February 13, 1880.

*To all whom it may concern:*

Be it known that I, JACOB H. COFFMAN, of West Philadelphia, in the county of Philadelphia and State of Pennsylvania, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1 is a plan view of my improved brake for carts or other two or more wheeled vehicles. Fig. 2 is a longitudinal vertical section of the same, and Fig. 3 is a top view of the shafts.

This invention provides for braking at the desired time and under the required circumstances the wheels of a vehicle, especially of a cart or other two-wheeled vehicle, and is operated or applied by the holding action of the horse or animal in descending a declivity; and it consists of brake-shoes hung upon the under side of the vehicle with their shaft or axis connected to rods or arms adapted to slide in the shafts of the vehicle, and to permit the connecting of the breeching thereto; and it consists, further, of holding or locking devices for the sliding staples, substantially as hereinafter more fully set forth.

To put into practice my invention I have illustrated a cart, while it is equally applicable to any two or more wheeled vehicle.

A is the body, B the axle, and C C the wheels.

D D are the shafts, which are connected to the axle by the brake-shoe shaft, thus causing the latter to serve in a twofold capacity and maintain simplicity and not multiply the means of attachment through an additional appendage, and at the same time provide against the accidental detachment of the shafts from the axle, as is liable to occur with the ordinary means for connecting the shafts to the axle.

E E are the brake-shoes, connected to the aforesaid crank-shaft F, which is hung in eyebolts $a$ $a$, passing through and bolted to the axle or otherwise suitably connected to it. These shoes face the peripheries of disks or rings $b$ fastened upon the hubs, or, if desired, to the spokes of the wheels. They are arranged to press against the under sides of the disks or rings $b$, and thus permit of the latter slipping, though in contact with the shoes, and retard the motion of the wheels, but not stop their motion. This, it will be observed, is desirable in descending a declivity, slight or great, to avoid impelling the horse, and thus allow him to travel at the usual gait, or at the same rate as though he were traveling on a level road. These shoes are connected to rods G, which extend through proper guides $c$ on the under side of the shafts D forward a suitable distance—say to $d$—and are then extended up through slots $e$ in the shafts, and above in the direction of the shafts, forming the part $f$, and again extended, this time downwardly through other slots, $g$, in the forward ends of the shafts D, with their forward ends extended under the shafts and free from the latter.

The breeching-strap hooks, eyes, or buckles $i$ are connected to and adapted to slide upon the part $f$ of the brake-rods G, by which it will be seen that, by the holding action of the horse while descending a hill or descent, the breeching-strap hooks will be slid back and caused to draw upon the rods G, and thus apply the brakes or shoes and retard the motion of the vehicle, as above intimated.

When a level has been regained it will be observed that by the sliding forward movement of the breeching-strap buckles, caused by the horse ceasing to hold back and the pulling or drawing action of the tugs $j$, the brakes or shoes will be taken off and permit the wheels to move with their usual freedom.

H H are locking or holding devices, in the form of plates, hinged to the shafts, and with their forward ends adapted to bear or fit against the rear ends of the part $d$ of the brake-rods G, and thus serve to prevent the application of the brakes, as is desired, when backing the horse, and under whatever other circumstances such may be found necessary.

When the brakes are to be applied the plates H are swung back upon the shafts.

Having thus fully described my invention, I claim and desire to secure by Letters Patent—

1. In a brake for vehicles, the combination of the brake-shoes and their shaft F with the axle B and shafts D, the shaft F serving in a twofold capacity, substantially as shown and described.

2. In a vehicle-brake, the brake-shoes with their crank-shaft connected to rods G and axle B, in combination with slotted vehicle-shafts and devices H, hinged to said shafts and adapted to hold the brake-shoes from the wheels $b$, substantially as and for the purpose set forth.

In testimony that I claim the foregoing I have hereunto set my hand and seal this 2d day of February, 1880.

J. H. COFFMAN. [L. S.]

Witnesses:
FRED. W. MUSSON,
WM. B. WEIR.